3,795,581
METHOD OF MAINTAINING OR RESTORING THE 2,3-DIPHOSPHOGLYCERATE CONTENT OF HUMAN RED CELLS

Fred H. Deindoerfer, Northridge, and Jon M. Brake, Burbank, Calif., assignors to American Hospital Supply Corporation, Evanston, Ill.
No Drawing. Filed Nov. 1, 1971, Ser. No. 194,689
Int. Cl. A61k 27/10
U.S. Cl. 195—1.8                    10 Claims

ABSTRACT OF THE DISCLOSURE

Viable human red cells are contacted with an aqueous solution of dihydroxyacetone (DHA), and held in contact with the DHA solution to maintain and/or increase their 2,3-diphosphoglycerate (2,3-DPG) content. The method is particularly useful in the storage and preservation of whole blood.

BACKGROUND AND SUMMARY

The state of the art with respect to biochemical knowledge of the chemical makeup and functioning of red cells (erythrocytes) is summarized in two recent publications: Red Cell Metabolism and Function, edited by George J. Brewer, Plenum Press, 1970; and Red Cell Metabolism, Ernest Beutler, Grune and Stratton, 1971. The principal energy source for red cells is glucose (or equivalent sugar) which is metabolized by the cells through complex biochemical pathways involving enzymatic reactions. The principal pathway, often referred to as the Embden-Meyerhoff pathway, involves the anaerobic breakdown of glucose to pyruvic or lactic acid. An additional pathway is referred to as the direct oxidative shunt or hexose monophosphate shunt.

In the Embden-Meyerhoff pathway, the compound 1,3-diphosphoglycerate is produced from D-glyceraldehyde-3-phosphate. The 1,3-diphosphoglycerate is converted by interaction with ALP (adenosine diphosphate) to ATP (adenosine triphosphate) and 3-phosphoglycerate, the reaction being catalyzed by phosphoglycerate kinase. An alternate by-path also leads to 3-phosphoglycerate, by way of 2,3-diphosphoglycerate (2,3-DPG)—an important regulator of the oxygen affinity of hemoglobin. The complexing of 2,3-DPG with hemoglobin decreases the affinity of oxygen ($O_2$) to hemoglobin in a manner essential to the release of oxygen to the body tissues.

In human blood, the normal level of 2,3-DPG is within the range from 12 to 18 micromoles 2,3-DPG per gram of hemoglobin. Beutler gives a more precise figure:

$$15.36 \pm 1.98$$

micromoles 2,3-DPG/g. hemoglobin (Red Cell Metabolism supra., p. 99). In the body, under usual conditions, sufficient 2,3-DPG is produced by the red cells in the metabolism of glucose by the Embden-Meyerhoff pathway to provide the required amount for proper oxygen-hemoglobin-tissue transfer. For reasons that are not understood, however, the 2,3-DPG content of red cells in stored blood decreases to subnormal levels interfering with oxygen released by the cells, even though blood is stored under refrigerator conditions (1–6° C.) in admixture with an anticoagulant solution containing dextrose (or equivalent sugar) as the principal energy source for the red cells. Therefore, although the red cells remain viable, contain sufficient ATP, and provide a satisfactory survival rate (70% or more after 24 hours), the subnormal 2,3-DPG content of the red cells may actually cause a decrease in the oxygen delivered to the tissues for several hours after the transfusion, and as long as 24 hours may be required for the transfused red cells to be restored to normal 2,3-DPG levels for efficient delivery of oxygen to the tissue. (Dawson, "The Hemoglobin Function of Blood Stored at 4° C.", pp. 305–317, in Red Cell Metabolism and Function, supra).

The problem of administering stored blood deficient in 2,3-DPG is rendered more acute under many clinical conditions, such as patients in septic shock, patients receiving large volumes of stored blood, and infants, particularly premature infants, with infection or the respiratory disease syndrome, since the 2,3-DPG levels of the patient's blood may already be depressed, and further depression may occur on administration of the low 2,3-DPG level blood.

Since the recognition of the function of 2,3-DPG as an oxygen release regulator for hemoglobin, and the recognition that depressed levels of 2,3-DPG can occur in the body and under in vitro storage of blood, there has been a widespread search for chemical additives or other means of maintaining, or even increasing, the 2,3-DPG content of red cells. It has been found that frozen blood stored under very cold conditions (viz. $-85°$ C.) can be stored for many months without significant change in 2,3-DPG levels. However, because of the added expense in freezing blood and storing it in the frozen condition, the use of frozen blood has not become a commercial blood storage practice. The almost universal procedure in the United States at the present time is to combine the freshly collected blood with an anticoagulant solution containing dextrose, such as citrate-dextrose solution or a citrate-phosphate-dextrose solution, and then to store the blood under refrigeration at a substantially constant temperature within the range from 1 to 6° C. Following this procedure, blood bank storage is approved up to 21 days, and if the blood is not administered by that time, it usually must be discarded.

It has been found that elevating blood pH on the alkaline side, such as from a normal pH of about 7.4 up to a pH of 7.5–7.7 tends to arrest the decline of 2,3-DPG under refrigerator storage conditions. This contrasts with the standard anticoagulant solutions, which lower the pH of stored blood to the acid side. However, it is necessary to incorporate dextrose in the stored blood under sterile conditions, and this requires heat sterilization of the additive solutions. If the anticoagulant solution is steriliized at an alkaline pH (viz. pH 8.0), the dextrose may be discolored due to "browning." Consequently, practical utilization of the pH increase finding with respect to maintaining 2,3-DPG levels would require a special container, having a separate pouch for the pH adjusting agent, so that it can be sterilized separately from the dextrose, and thereafter both the anticoagulant solution and the pH adjusting solution combined with the collected blood. No commercial applications of this approach are therefore known to have occurred.

An interrelated problem is that of maintaining ATP levels in stored blood, the decline in the quality of stored blood having been found to be due to the deterioration of ATP content of the red cells as well as the 2,3-DPG content thereof. It is known that the addition of adenine helps to maintain ATP levels in stored blood, but, unfortunately, this has been found to be at the expense of 2,3-DPG levels, that is, the addition of adenine can cause an even more rapid deterioration in 2,3-DPG levels. This effect has been found to be offset to some extent by also adding inosine, which compound also appears to have some value in rejuvenating blood with subnormal 2,3-DPG levels. However, the use of inosine as an additive for blood storage or rejuvenation has not been approved, and it appears that the toxicity of inosine is open to question. The pathway utilizing inosine can form hypoxanthine, which can convert to insoluble uric acid salts.

This invention is based in part on the discovery that dihydroxyacetone (DHA) can favorably affect the 2,3-DPG content of viable red cells both in vivo and in vitro. More specifically, the addition of millimolar quantities of DHA to blood can restore the red cells to normal 2,3-DPG levels within a short time and, under certain conditions, elevate the 2,3-DPG to significantly higher than normal levels. Further, the presence of millimolar quantities of DHA in stored blood prevents the rapid deterioration of 2,3-DPG content, and tends to maintain the cells at near normal 2,3-DPG levels for a much longer period of time under refrigerator storage conditions.

The mechanism of action of DHA is not fully understood. On the basis of prior knowledge, there appears to be no reason to assume that this compound would favorably affect the 2,3-DPG level of blood. Within the red cells, the DHA would be expected to be converted by interaction with ATP to dihydroxyacetone phosphate, which is a normal metabolic intermediate in the Embden-Meyerhoff pathway. This intermediate would therefore be expected to be produced in the metabolism of glucose to pyruvic or latic acids, which occurs continuously during refrigerator storage of blood due to the presence of added glucose as the principal energy source. Notwithstanding this, however, rapid deterioration of 2,3-DPG occurs under storage conditions. It is therefore surprising and unexpected that the contacting of viable red cells with a solution of DHA can markedly affect, appreciably increasing and/or maintaining, the 2,3-DPG level of the red cells. The results obtained are most striking, providing a highly effective answer to the problem of maintaining or restoring 2,3-DPG levels in red cells.

Assuming that DHA is converted in the cells to dihydroxyacetone phosphate, which is a normal metabolic intermediate, no unusual or additional reaction products appear to be produced. A heretofore unrecognized mechanism or interaction seems to be involved. According to the Embden-Meyerhoff pathway, the dihydroxyacetone phosphate would be first converted to D-glyceraldehyde-3-phosphate. If so, the next lower metabolic intermediate would be 1,3-diphosphoglycerate, which, as in the normal metabolism of glucose, can be converted to either 3-phosphoglycerate or 2,3-DPG. On the basis of present knowledge, therefore, it is unexplainable why additional 1,3-diphosphoglycerate resulting from added DHA would produce relatively more 2,3-DPG (by the alternate bypass) rather than 3-phosphoglycerate.

Prior to the present invention, very few medical uses of DHA have been proposed. The South African patent specification No. 67/5,712 proposes the use of DHA for treating an anoxemic state; namely, lactic acidosis. More specifically, this patent specification claims that the injection of DHA into a warm-blooded animal in shock is capable of reducing the latic acid in its blood. The red cells of the blood are not involved, and, the mode of action of the DHA is such that the red cells could not participate. According to the disclosure of the South African specification, the DHA is converted to dihydroxyacetone phosphate, which is then reduced to alpha-glycero-phosphate by an enzyme which simultaneously oxidizes nicotinamide adenine dinucleotide, reduced form ($NADH_2$) to its oxidized form (NAD). This is a reaction which does not occur in red cells. Alpha-glycerophosphate is not one of the phosphorylated metabolites of red cells. G. R. Bartlett, Biochim. Biophys. Acta, 156, 221–230 (1968). The human red cell is in many respects a "defective" cell, in that it has no nucleus, no mitochondria, and a very limited metabolism. The mechanism by which DHA could reduce lactic acid requires the participation of body cells containing mitochondria to oxidize alpha-glycero-phosphate, as produced in normal cells, to DHAP. Further, the South African patent specification suggests that alpha-glycero-phosphate can react with fatty acids to form glycerides, but the red cell is known to have no sgnificant lipid synthesizing ability.

DETAILED DESCRIPTION

Broadly stated, the method of this invention can be utilized to favorably affect the 2,3-diphosphoglycerate (2.3-DPG) content of viable red cells by the simple procedure of contacting the red cells with an aqueous solution of dihydroxyacetone (DHA). The aqueous solution, which may be plasma, or a mixture of plasma with an anticoagulant solution, should contain at least 1.5 millimoles (mM.) of DHA per liter of solution. On the basis of whole blood, which is roughly ⅓ red cells by volume, the DHA content would be at least about 1 mM. per liter of blood.

While the upper limit on DHA content is not critical, there is no need to contact the red cells with large excesses of DHA. For example, it appears that the maximum favorable effects of the DHA can be obtained at concentrations in the range of 7.5 to 150 mM. per liter of solution. On the basis of present data, it is preferred to contact the red cells with an aqueous solution containing from about 7.5 to 75 mM. DHA per liter of solution. Where the DHA is added to whole blood, from 10 to 100 mM. of DHA per liter of blood are preferably added per liter of blood. The available evidence indicates that the optimum effect for either maintenance or restoration of 2,3-DPG levels can usually be obtained within this range. When the DHA is being used as a partial or complete substitute for the sugar, levels of 20 to 100 mM. DHA/liter blood are desirable.

Where it is desired to increase the 2,3-DPG content of red cells, either to elevate it above the normal level or to restore it from a lower to a higher level, the red cells should be held in contact with the solution of DHA for a sufficient time to increase their 2,3-DPG content by at least 1.0 micromoles per gram hemoglobin over their initial 2,3-DPG content. Suitable procedure for making this determination is described by Loos and Prins, "Application of a Mechanized Method for the Determination of Different Glycolytic Intermediates in the Routine Quality Control of Red Cells," in Red Cell Metabolism and Function, ed. Brewer, Plenum Press, 1970, pp. 277–288. For restoration of 2,3-DPG content of red cells having depressed levels thereof, such as the level below 10 micromoles per gram hemoglobin, the amount of DHA employed and the holding time are preferably such as to increase the 2,3-DPG level of the red cells by at least 10% over its initial value. Where the 2,3-DPG level is further depressed, such as to a level below 5 micromoles per gram hemoglobin, the DHA can be utilized to increase the 2,3-DPG content of the cells by as much as 100–500% or more of the initial value.

In achieving these results, as indicated above, it is preferred to incorporate at least 5, or preferably at least 10 mM. of DHA in the whole blood containing the viable red cells with a sub-normal level of 2,3-DPG. Usually the maximum restoration of 2,3-DPG can be obtained within the range from 10 to 100 mM. DHA/liter blood.

In an application of particular commercial importance, the DHA is added to the fresh blood immediately after the collection of the fresh blood. In practicing this embodiment of the method, the anticoagulant solutions and collection and preservation systems can be employed, which are described in my copending application, entitled "Improved Blood Collection and Preservation Unit," being Ser. No. 194,652, filed on even date herewith. Concurrently with the extraction of the blood and immediately after its introduction into the collection and preservation container, from 5 to 50 mM. of DHA per liter of blood is mixed therewith. The DHA should be dissolved in a sterile solution, such as sterile water, or an aqueous anticoagulant solution containing dextrose or other ingredients. The mixture of the blood in DHA is then stored at a temperature below 10° C., preferably a temperature within the range from 1 to 6° C. The storage may be continued as in present practice for 21 days. At the end of that time, the blood will contain significantly more 2,3-DPG than blood stored under the same conditions without the red cells being in contact with DHA. The method also permits blood to be stored longer than 21 days, while still being of as good or better quality with respect to 2,3-DPG content than blood stored by standard prior art methods, such as the use of anticoagulant citrate-dextrose solutions or anticoagulant citrate-phosphate-dextrose solutions.

In the preservation and storage of whole blood, it appears that the optimum level for the incorporation of DHA therein is within the range from about 10 to 30 mM. of DHA per liter of blood. However, as indicated above, more DHA can be incorporated without harmful results, and the excess DHA for maintenance of 2,3-DPG can apparently be utilized by the red cells as an auxiliary energy source to the dextrose, which is preferably also incorporated in the blood prior to storage. Alternatively, other sugars can be used, such as fructose, mannose, and galactose. In the use of the method in connection with the storage and preservation of blood, an anticoagulant agent will also be incorporated in the blood, as is now standard practice. Citrate ions are preferred as the anticoagulant agent, and may be added as sodium citrate, citric acid, or a mixture of citric acid and sodium citrate.

In the following examples, data are presented based on analytical determinations of 2,3-DPG content of red cells. The analytical procedure used was adopted from the method described by J. A. Loos and H. K. Prins, "Application of a Mechanized Method for the Determination of Different Glycolytic Intermediates in the Routine Quality Control of Red Cells," in "Red Cell Metabolism and Function," ed. G. J. Brewer, Plenum Press, New York, 1970, pp. 277–288. This method utilizes the catalytic effect of DPG on the enzymatic conversion of 3-phosphoglycerate to 2-phosphoglycerate. By adding other enzymes, the 2-phosphoglycerate is converted to lactate, with concomitant oxidation of nicotinamide adenine dinucleotide, reduced form (NADH). The latter compound fluoresces, so the rate of the reaction can be followed by a fluorometer. The blood sample is diluted 1:12000 with 0.011 M ammonia before analysis. A Technicon auto-analyzer was used to perform the analyses automatically.

EXAMPLE I

Freshly collected human blood was mixed with a standard anticoagulant solution, Citrate Phosphate Dextrose (CPD) U.S. Pharmacopeia XVIII, pp. 48–49, according to the U.S.P. recommended procedure. Adenine was also incorporated in the blood in the amount of 555 mg. per liter of blood. The pH of the anticoagulant was adjusted to 7.0 with 1 N sodium hydroxide. The blood was divided into two groups of test samples. One group served as the control, and into the other was added the test compound DHA in the amount of 1.8 grams per liter of blood. The blood samples were stored under refrigeration at 4° C. for 5 weeks. Measurements of 2,3-DPG content were made at the end of each week. The data obtained are summarized below in Table A:

TABLE A

| Time (weeks) | 2,3-diphosphoglycerate (percent of initial value) | |
| --- | --- | --- |
| | Without DHA | With DHA |
| 0 | 100 | 100 |
| 1 | 100 | 101 |
| 2 | 103 | 133 |
| 3 | 65 | 114 |
| 4 | 34 | 95 |
| 5 | 21 | 72 |

EXAMPLE II

Human blood was combined with a standard anticoagulant solution, Citrate Dextrose (ACD), U.S. Pharmacopeia XVIII, p. 47 according to the recommended procedure. The blood was stored for two weeks under refrigeration at 4° C. As shown by determination of 2,3-DPG level, the stored blood had deteriorated from an initial level of 11.50 micromoles of 2,3-DPG per gram of hemoglobin to a level after two weeks of storage of 0.26 micromoles per gram hemoglobin. DHA was then added to give the blood a final concentration of 20 mM. DHA per liter. The blood was then incubated for 3 hours at 37° C., and measurements of the improvement in 2,3-DPG levels were made over this time period. The resulting data are summarized below in Table B:

TABLE B

| Incubation time (hours): | 2,3-diphosphoglycerate (percent of initial value) |
| --- | --- |
| 0 | 100 |
| 0.5 | 448 |
| 1.5 | 488 |
| 3.0 | 600 |

EXAMPLE III

Dihydroxyacetone, 25 mg./ml. in 0.9% sodium chloride, was injected at a dose of 5 ml./kg. into a healthy female Canadian White rabbit. Blood samples (2 ml.) were drawn at various times after injection and analyzed for 2,3-diphosphoglycerate as described in the text, except that a dilution of 1:24,000 was employed, due to the higher level of DPG in normal rabbit blood compared to human blood. The data are summarized below in Table C:

TABLE C

| Blood sample taken at: | 2,3-diphosphoglycerate (percent of pre-injection level) |
| --- | --- |
| ½ hour before injection | 100 |
| 1 hour after injection | 127 |
| 7 hours after injection | 124 |
| 24 hours after injection | 105 |

As shown by the foregoing data, this invention provides a means for favorably affecting the 2,3-DPG content of red cells. For example, where the 2,3-DPG content is at a sub-normal level, such as a level below 10 micromoles per gram hemoglobin, the addition of at least 10 millimoles of DHA per liter of blood, followed by the holding of the blood with the DHA in contact with the red cells can increase the 2,3-DPG level thereof to a value within the range from 12 to 18 micromoles per gram hemoglobin. When the method of the invention is applied to fresh blood, the 2,3-DPG content of the red cells can be increased and/or maintained by adding at least 10 millimoles of DHA per liter of blood, and storing the blood at a temperature of 1 to 6° C. with the DHA in contact with the red cells.

We claim:

1. The method of maintaining the 2,3-diphosphoglycerate (2,3-DPG) content of viable human red cells stored in contact with an aqueous solution, comprising incorporating in said aqueous solution at least 1.5 millimoles (mM.) of dihydroxyacetone (DHA) per liter of solution, and holding said red cells in contact with said DHA containing solution for sufficient time to maintain their 2,3-DPG content at a level of at least 1.0 micromoles per gram hemoglobin greater than a control sample of said red cells held without DHA contact but otherwise under identical conditions.

2. The method of claim 1 wherein said DHA is incorporated in said aqueous solution in an amount of from 7.5 to 150 mM. DHA per liter of solution.

3. The method of maintaining the 2,3-diphosphoglycerate (2,3-DPG) content of the red cells of whole human blood under storage conditions, comprising adding to said blood after the collection thereof at least 5 millimoles (mM.) of dihydroxyacetone (DHA) per liter of blood, and storing said DHA containing blood without freezing at a temperature below 10° C.

4. The method of claim 3 wherein from 5 to 50 mM. of said DHA is added to said blood immediately after collection thereof.

5. The method of maintaining the 2,3-diphosphoglycerate (2,3-DPG) content of the red cells of human blood under storage conditions, comprising adding to said blood after the collection thereof from 10 to 100 millimoles (mM.) of dihydroxyacetone (DHA) per liter of blood, and storing said blood at a temperature of 1 to 6° C. with said DHA in contact with said red cells.

6. The method of claim 5 wherein from 10 to 30 mM. of said DHA is added to said blood immediately after collection thereof.

7. The method of restoring the 2,3-diphosphoglycerate (2,3-DPG) content of the viable red cells of human blood which have a sub-normal level of 2,3-DPG, comprising adding to said blood at least 5 millimoles (mM.) of dihydroxyacetone (DHA) per liter of blood, and maintaining said blood with said DHA therein until the 2,3-DPG level of said red cells is increased over its initial value by at least 10%.

8. The method of restoring the 2,3-diphosphoglycerate (2,3-DPG) content of the viable red cells of human blood which have a 2,3-DPG content below 10 micromoles per gram hemoglobin, comprising adding to said blood from 10 to 100 millimoles (mM.) of dihydroxyacetone (DHA) per liter of blood, and maintaining said blood with said DHA in contact with said red cells until the 2,3-DPG level thereof is within the range of 12 to 18 micromoles per gram hemoglobin.

9. The method of increasing the 2,3-diphosphoglycerate (2,3-DPG) content of viable human red cells, comprising contacting said red cells with an aqueous solution of dihydroxyacetone (DHA) containing at least 1.5 millimoles (mM.) of DHA per liter of solution, and maintaining red cells in contact with said solution for a sufficient time to increase their 2,3-DPG content by at least 1.0 micromoles per gram hemoglobin over their initial 2,3-DPG content.

10. The method of claim 9 wherein said aqueous solution when initially contacted with said red cells contains from 7.5 to 150 mM. DHA per liter of solution.

References Cited

Chemical Abstracts, vol. 67, entry 80422k, 1967.

Strickland et al.: Biochimica et Biophysica Acta, vol. 159, No. 2, pp. 221–226, 1968.

RICHARD L. HUFF, Primary Examiner

U.S. Cl. X.R.

424—331